United States Patent

Sato et al.

[19]

[11] Patent Number: 4,753,853
[45] Date of Patent: Jun. 28, 1988

[54] DOUBLE-LAYERED MAGNETOOPTICAL RECORDING MEDIUM

[75] Inventors: Masatoshi Sato, Tokyo; Hideki Akasaka, Kanagawa, both of Japan

[73] Assignee: Nippon Kogaku K.K., Yokohama, Japan

[21] Appl. No.: 716,210

[22] Filed: Mar. 26, 1985

[30] Foreign Application Priority Data

Nov. 12, 1984 [JP] Japan .................. 59-237994

[51] Int. Cl.$^4$ .............................................. G11B 7/24
[52] U.S. Cl. ................................... 428/679; 428/681; 428/686; 428/694; 428/900
[58] Field of Search ............. 428/694, 900, 668, 679, 428/681, 686; 365/122; 360/131, 135; 369/28 B, 13

[56] References Cited

U.S. PATENT DOCUMENTS

| 4,518,657 | 5/1985 | Yanagida | 428/446 |
| 4,556,291 | 12/1985 | Chen | 350/377 |
| 4,569,881 | 2/1986 | Freese et al. | 428/900 |

FOREIGN PATENT DOCUMENTS

74843 6/1981 Japan .
78652 5/1982 Japan .

OTHER PUBLICATIONS

Taylor et al; "Magnetic Anisotrophy in Evaporated Amorphons Films of the Ternary System $Gd_x(Fe_{1-y}Co_y)_{1-x}$ Journal of Applied Physics vol. 48(1) 1977 p. 358.

*Primary Examiner*—George F. Lesmes
*Assistant Examiner*—William Atkinson
*Attorney, Agent, or Firm*—Finnegan, Henderson, Farabow, Garrett & Dunner

[57] ABSTRACT

A double-layered magnetooptical recording medium consists of two exchange-coupled layers that permit perpendicular magnetization, one layer having a low Curie point and a high coercive force and the other layer having a high Curie point and a low coercive force. The layer having low coercive force is made of a transition metal rich amorphous $Gd_U(Fe_VCo_{100-V})_{100-U}$ alloy having the following compositional range, and the layer having high coercive force is made of a transition metal rich amorphous $Tb_WFe_{100-W}$ alloy having the following compositional range:

$U = 20-26$ atomic %,
$V = 50-80$ atomic %, and
$W = 27-33$ atomic %.

4 Claims, 1 Drawing Sheet

DOUBLE-LAYERED MAGNETOOPTICAL RECORDING MEDIUM

BACKGROUND OF THE INVENTION

1. Field of the Invention

This invention relates to a magnetooptical recording medium with which writing, reading, and erasing of information are performed through application of a laser beam.

2. Description of the Prior Art

In recent years, a substantial amount of effort has been directed toward the development of an optical recording medium which satisfies various requirements including high density, large capacity and high speed access.

Of a wide range of optical recording media, magnetooptical recording medium is most attractive due to its unique advantage that information can be erased after use and new information can be written thereon (see U.S. Pat. No. 3,965,463). The magnetooptical recording medium comprises a glass or plastic disk substrate and a perpendicular magnetization layer as a recording material which is formed on the substrate.

In general the recording medium has a concentric circular or spiral recording track, the direction of magnetization of which track is entirely forced to be for example downward (or upward) by a strong external magnetic field before writing an information. An information can be written with a presence and/or length of pit having a reversed, for example upward (or downward), magnetization against the primary direction of magnetization.

Principle of Pits Formation

In the pits formation, a feature of laser, superb coherence in space and time, are advantageously used to focus a beam into a spot as small as the diffraction limit determined by the wavelength of the laser light. The focused light is applied to the disk surface to write data by producing pits less than 1 μm in diameter on the surface, or to retrieve the stored information from a video or audio disk. In the optical recording, a recording density up to around $10^8$ bit/cm$^2$ can be theoretically attained, since a light beam can be concentrated into a spot with a diameter as small as its wavelength. As shown in FIG. 1, in a magnetooptical recording, a laser beam (L) is focused onto a recording layer 2 to heat its surface while a bias magnetic field (Hb) is externally applied, so that magnetization (M) in the locally heated surface area can be alighned in the direction of the bias magnetic field. As a result, reversal magnetized pits (P) are formed. The magnetic field strength required to reverse the magnetization (M) in a recording layer 2, the minimum magnetic field strength (Hc) capable of forming pits varies with temperature; generally this field strength (Hc), decreases as the temperature increases.

Even a weak magnetic field otherwise unsuitable for pits formation at room temperature can thus be used for recording if the recording layer 2 is heated to a lower Hc.

Ferromagnetic and ferrimagnetic materials differ in the temperature dependencies of M and Hc. Ferromagnetic materials have Hc which decreases around the Curie temperature, and recording is performed based on this phenomenon; thus it is referred to as Tc recording (Curie temperature recording).

By contrast, ferrimagnetic materials have a compensation temperature, below the Curie point, at which magnetization (M) becomes zero. Since Hc drastically changes around this temperature, data recording by means of light becomes possible. This process is called the T comp. recording (compensation temperature recording). However, Tc recording is also possible on ferrimagnetic materials.

Principle of Reading

FIG. 2 illustrates the principle of data reading based on the magnetooptical effect. Light is an electromagnetic wave with an electromagnetic-field vector normally emmanating in all directions on the plane perpendicular to the light path. When light is converted to linear polarized beams and applied onto a recording medium, it is reflected by the surface or passes through the recording layer 2, at this time the plane of polarization rotates according to the direction of magnetization (M).

For example, if the polarization plane rotates $\theta_k$ degrees for upward magnetization, it rotates $-\theta_k$ degrees for downward magnetization. Therefore, if the axis of a light analyzer is set perpendicular to the plane inclined at $-\theta_k$ degrees to the recording surface, the light reflected by a downward-magnetized surface area cannot pass through the analyzer, whereas the light reflected by an upward-magnetized pit (P) can be captured by the detector for an amount of sin ($2\theta_k$). As a result, upward-magnetized pits show up brighter than downward-magnetized ares.

No single magnetic material has been found that permits easy recording (high Curie point), has good storage stability (high coercive force) and achieves high C/N ratio during reproduction, or read-out (great angle of the Kerr rotation). Therefore, a magnetooptical recording medium has been proposed, as in Japanese Unexamined Published Patent Application No. 78652/1982, that has the necessary functions fulfilled separately by two layers of different magnetic materials. This recording medium consists of two exchange-coupled layers that permit perpendicular magnetization, one layer having a low Curie point and a high coercive force, and the other having a high Curie point and a low coercive force. The layer of high coercive force having a low Curie point fulfills the function of information recording and storage. The recorded information is transferred to the exchange-coupled layer of low coercive force having a high Curie point and a great angle of the Kerr rotation, and is read from this layer.

The sole example of the double-layered magnetooptical recording medium that is shown in Japanese Unexamined Published Patent Application No. 78652/1982 uses a Tb-Fe amorphous alloy in the layer of high coercive force. However, according to the experiments conducted by the present inventors, no samplef of the recording medium shown in this example had values of C/N ratios higher than 53 dB and, hence, this recording medium was found to be unsuitable for commercial use.

SUMMARY OF THE INVENTION

The principal purpose, therefore, of the present invention is to provide a double-layered magnetooptical recording medium having a C/N ratio of at least 55 dB, especially at least 60 dB.

As a result of detailed studies on the effects of the components and composition of amorphous alloys on the C/N ratio, the present inventors have found that C/N ratios of 55 dB or higher can be obtained not only by incorporating Co in the Gd-Fe alloy and preparing Gd-Fe-Co and Tb-Fe layers having highly specified compositional ranges but also by rendering the directions of net magnetization in the two layers parallel to each other. The present invention has been accomplished on the basis of this finding.

Therefore, in accordance with one aspect of the present invention, there is provided a double-layered magnetooptical recording medium consisting of two exchange-coupled layers that permit perpendicular magnetization, one layer having a low Curie point and a high coercive force and the other layer having a high Curie point and a low coercive force, wherein said layer having low coercive force is made of a transition metal rich amorphous $Gd_U(Fe_VCo_{100-V})_{100-U}$ alloy having the following compositional range, and said layer having high coercive force is made of a transition metal rich amorphous $Tb_WFe_{100-W}$ alloy having the following compositional range:

U = 20–26 atomic%
V = 50–80 atomic%, and
W = 27–33 atomic%.

In accordance with another aspect of the present invention, there is provided a double-layered magnetooptical recording medium consisting of two exchange-coupled layers that permit perpendicular magnetization, one layer having a low Curie point and a high coercive force and the other layer having a high Curie point and a low coercive force, wherein said layer having low coercive force is made of a transition metal rich amorphous $Gd_X(Fe_YCo_{100-Y})_{100-X}$ alloy having the following compositional range, and said layer having high coercive force is made of a transition metal rich amorphous $Tb_ZFe_{100-Z}$ alloy having the following compositonal range:

X = 20–26 atomic%,
Y = 50–80 atomic%, and
Z = 18–26 atomic%.

The recording medium in accordance with this second aspect is particularly preferred since it achieves a C/N ratio of 60 dB or higher.

Terbium (Tb) and gadolinium (Gd) are usually classified as rare earth metals, and iron (Fe) and cobalt (Co) as transition metals. The "transition metal rich" composition as used in the present invention is such that the sublattice moment of a transition metal in the alloy of interest is greater than that of a rare earth metal. The sublattice moments of the rare earth metal and transition metal are always directed anti-parallel ( ↑ ↓ ). If the two sub-lattice moments are not balanced, the difference shows externally as a net magnetization.

The magnetooptical recording medium of the present invention consists of two magnetic layers, one having a low coercive force and the other a high coercive force. The net magnetizations in the two layers must directed parallel to each other ( ↑ ) or ( ↓ ). If their directions are andi-parallel ( ↑ ) or ( ↓ ), the C/N ratio of the recording medium is reduced.

Each of the two magnetic layers generally has a thickness of 100–10,000 Å, preferably 100–1,000 Å, and is formed by a suitable thin-film forming technique such as vacuum evaporation, sputtering or ion plating. Preferably, the formation of one layer is immediately followed by the formation of the other layer without breaking the vacuum. This is effective for providing a greater interface wall energy density between the two layers. In order to avoid the formation of a distinct boundary between the two layers, a heaterogeneous intermediate layer may be provided, wherein the alloy composition gradually changes from the layer of low coercive force to the layer of high coercive force, or vice versa.

The perpendicular magnetization layer composed of the two layers having different coercive forces may be directly formed on glass, plastic, ceramic or metal substrates, or any other suitable substrates. Alternatively, the magnetization layer may be formed on a substrate having a molded plastic layer for providing tracking grooves, a substrate having a protective coat made of, for example, an inorganic oxide (e.g. $SiO_2$, SiO, $Ta_2O_5$ or ZrO), an inorganic nitride (e.g. AlN, $Si_3N_4$ or $Ge_3N_4$), an inorganic carbide (e.g. SiC or TiC) or an inorganic fluoride (e.g. $MgF_2$, LiF or $AlF_3$), or a substrate having a protective coat on said molded plastic layer.

The perpendicular magnetization layer may be overlaid with said protective layer or an anti-reflection layer made of, for example, Cu, Au, Ag or Al.

The perpendicular magnetization layer may be formed on both sides of the substrate. Alternatively, two substrates each having the perpendicular magnetization layer on one side may be bonded together with an adhesive so that the magnetization layers face inwardly. As in the case of the conventional magnetooptical recording medium, a laser beam should provide the perpendicular magnetization layer with a sufficient amount of energy to perform good recording, but the incident beam must be reflected from the magnetization layer in a sufficient amount to ensure the proper reading of the recorded data. In order to meet these requirements, the proper substrate, protective layer and molded plastic layer should be selected and arranged in the right manner.

The magnetooptical recording medium in accordance with the first aspect of the present invention shows a C/N ratio of 55 dB or more, and the medium of the second embodiment exhibits a value of 60 dB or higher.

DESCRIPTION OF THE PREFERRED EMBODIMENTS

Figure 1:
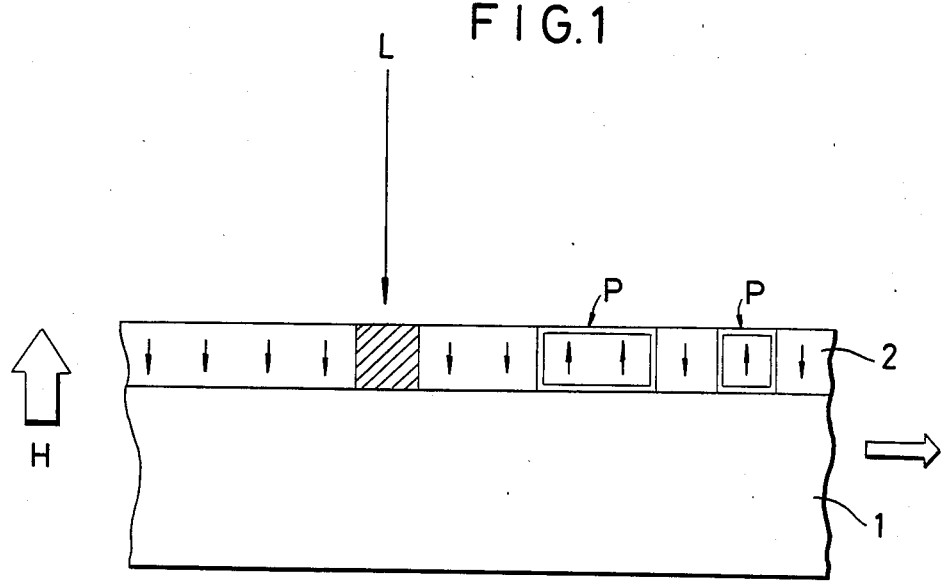
FIG. 1 shows the concept of information (pits) writing onto a recording layer 2 on the substrate 1 of a magnetooptical recording system.
Figure 2:
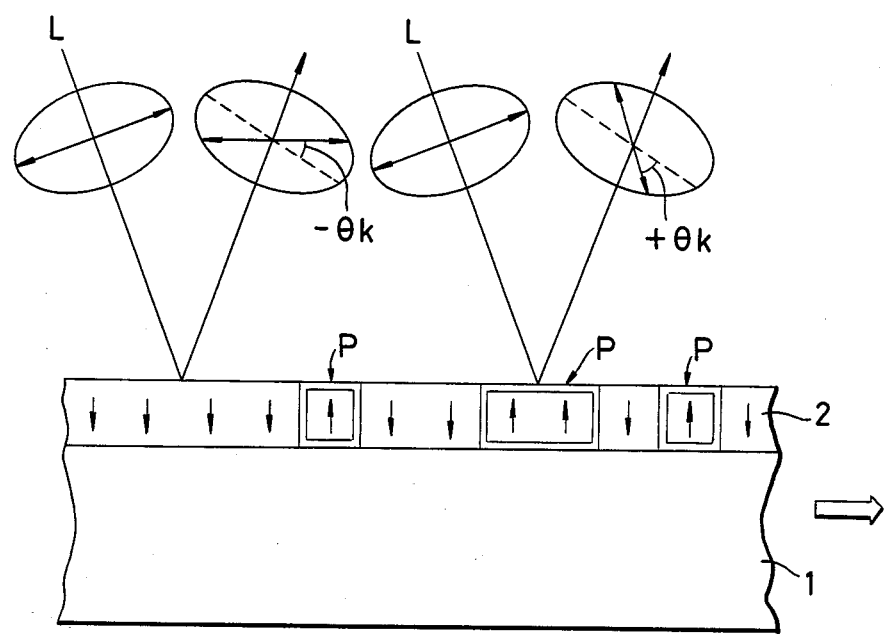
FIG. 2 shows the concept of information (pits) reading from the recording layer.

The following examples are provided as further illustrations of the invented recording medium and are not to be construed as limiting.

Example 1

A vacuum vapor deposition apparatus was used in this Example. It included two crucibles as evaporation sources and two units for heating the respective sources with an electron beam.

One crucible was charged with an FeCo alloy of a predetermined composition, and the other with metallic Gd. The bell jar was evacuated to $1-2 \times 10^{-6}$ Torr and the crucibles were heated so as to deposit a thin layer of low coercive force on a glass substrate (200 mm$^\phi$) at a deposition rate of 3 Å/sec. The deposited layer had a thickness of 500 Å, a Curie point of about 375° C., and a coercive force of about 150 Oe. The layer composition was $Gd_{24}(Fe_{70}Co_{30})_{76}$. Without breaking the vacuum in the bell jar, the FeCo alloy and metallic Gd in the crucibles were respectively replaced by metallic Fe and Tb. By repeating the same procedure, a thin $Tb_{30}Fe_{70}$ layer of high coercive force was obtained; it had a thickness of 500 Å, a Curie point of about 130° C. and a coercive force of about 4,000 Oe. These procedures provided a double-layered magnetooptical recording medium.

Example 2

Using the apparatus described in Example 1, an FeCo alloy having a different composition from what was used in Example 1 and metallic Gd were evaporated from the crucibles and deposited on a glass substrate. This provided a thin film of low coercive force. It had a thickness of 500 Å, a Curie point of about 375° C., a coercive force of about 175 Oe, and its composition was $Gd_{25}(Fe_{70}Co_{30})_{75}$. Without breaking the vacuum in the chamber, the same procedure was repeated except that the FeCo alloy and metallic Gd in the crucibles were replaced by metallic Fe and Tb, respectively. A thin $Tb_{27}Fe_{73}$ layer of high coercive force was obtained; it had a thickness of 500 Å, a Curie point of about 130° C. and a coercive force of about 13,000 Oe. These procedures provided a double-layered magnetooptical recording medium.

Example 3

Using the apparatus described in Example 1, an FeCo alloy having a different composition from what was used in Example 1 and metallic Gd were evaporated from the crucibles and deposited on a glass substrate. This provided a thin film of low coercive force; it had a thickness of 500 Å, a Curie point of about 375° C. and a coercive force of about 150 Oe, and its composition was $Gd_{24}(Fe_{70}Co_{30})_{76}$. Without breaking the vacuum in the chamber, the same procedure was repeated except that the FeCo alloy and metallic Gd in the crucibles were replaced by metallic Fe and Tb, respectively. A thin $Tb_{24}Fe_{76}$ layer of high coercive force was obtained; it had a thickness of 500 Å, a Curie point of about 130° C. and a coercive force of about 8,000 Oe. These procedures provided a double-layered magnetooptical recording medium.

Example 4

Vacuum deposition was performed as in Example 1 using the same apparatus, except that the composition of the FeCo alloy in one crucible and the deposition rates of transition metals and rare earth metals were changed. First, a layer of low coercive force was deposited on a glass substrate (200 mm$^\phi$); it had a thickness of 500 Å, a Curie point of about 410° C., a coercive force of about 50 Oe, and its composition was $Gd_{20}(Fe_{60}Co_{40})_{80}$. Without breaking the vacuum in the chamber, the same procedure was repeated except that the FeCo alloy and metallic Gd in the crucibles were replaced by metallic Fe and Tb, respectively. A thin $Tb_{22}Fe_{78}$ layer of high coercive force was obtained; it had a thickness of 500 Å, a Curie point of about 130° C., and a coercive force of about 4,000 Oe. These procedures provided a double-layered magnetooptical recording medium.

Example 5

Vacuum deposition was conducted as in Example 1 using the same apparatus, except that the composition of the FeCo alloy in one crucible and the deposition rates of transition metal and rare earth metals were changed. First, a layer of low coercive force was deposited on a glass substrate (200 mm$^\phi$); it had a thickness of 500 Å, a Curie point of about 350° C., a coercive force of about 200 Oe, and its composition was $Gd_{26}(Fe_{75}Co_{25})_{74}$. Without breaking the vacuum in the chamber, the same procedure was repeated except that the FeCo alloy and metallic Gd in the crucibles were replaced by metallic Fe and Tb, respectively. A thin $Tb_{26}Fe_{74}$ of high coercive force was obtained; it had a thickness of 500 Å, a Curie point of about 130° C. and a coercive force of about 10 kOe. These procedures provided a double-layered magnetooptical recording medium.

Comparative Example

The vacuum vapor deposition apparatus described in Example 1 was used, and metallic Fe was placed in one crucible and metallic Gd in the other crucible. As in Example 1, a thin $Gd_{24}Fe_{76}$ layer of low coercive force was deposited on a glass substrate (200 mm$^\phi$); it had a thickness of 500 Å, a Curie point of about 220° C. and a coercive force of about 150 Oe. Without breaking the vacuum in the chamber, the same procedure was repeated except that the metallic Gd was replaced by metallic Tb. A thin $Tb_{24}Fe_{76}$ layer of high coercive force was obtained; it had a thickness of 500 Å, a Curie point of about 130° C. and a coercive force of about 8,000 Oe. These procedures provided a double-layered magnetooptical recording medium.

C/N Ratio Measurement

The C/N ratios of the samples prepared in Examples 1 to 5 and the Comparative Example were measured with a magnetooptical record/reproduce apparatus under the following conditions.

| Conditions for the measurement | |
| --- | --- |
| Disk rotational speed | 1,800 rpm |
| Measured range of radius | 90 mm |
| Laser power in record mode | 9.1 mW (on disk) |
| External magnetic field in record mode | 400 Oe |
| Laser power in reproduce mode | 3.7 mW (on disk) |
| Resolving frequency | 30 kHz |
| Recording frequency | 1 MHz. |

The results are shown in Table 1 below.

TABLE 1

| Sample No. | C/N ratio (dB) |
| --- | --- |
| Example 1 | 56.5 |
| Example 2 | 57.0 |
| Example 3 | 60.4 |
| Example 4 | 60.5 |
| Example 5 | 60.3 |
| Comparative Example | 53.2 |

What is claimed is:

1. A double-layered magnetooptical recording medium comprising two exchange-coupled layers that permit perpendicular magnetization, one layer having a low Curie point and a high coercive force and the other layer having a high Curie point and a low coercive force, wherein said recording medium achieves a C/N ratio of 60 db or higher, and wherein said layer having low coercive force is made of a transition metal rich amorphous $Gd_X(Fe_YCo_{100-Y})_{100-X}$ alloy having the following compositional range, and said layer having high coercive force is made of a transitional metal rich amorphous $Tb_ZFe_{100-Z}$ alloy having the following compositional range:

$X = 20-26$ atomic%,
$Y = 50-80$ atomic%,
$Z = 18-26$ atomic%.

2. The recording medium of claim 1 wherein $X=24$, $Y=70$ and $Z=24$.

3. The recording medium of claim 1 wherein $X=20$, $Y=60$ and $Z=22$.

4. The recording medium of claim 1 wherein $X=26$, $Y=75$ and $Z=26$.

* * * * *